No. 75,209. PATENTED MAR. 3, 1868.
F. G. SIEMERS.
SCRAPER FOR ICE CREAM FREEZERS.
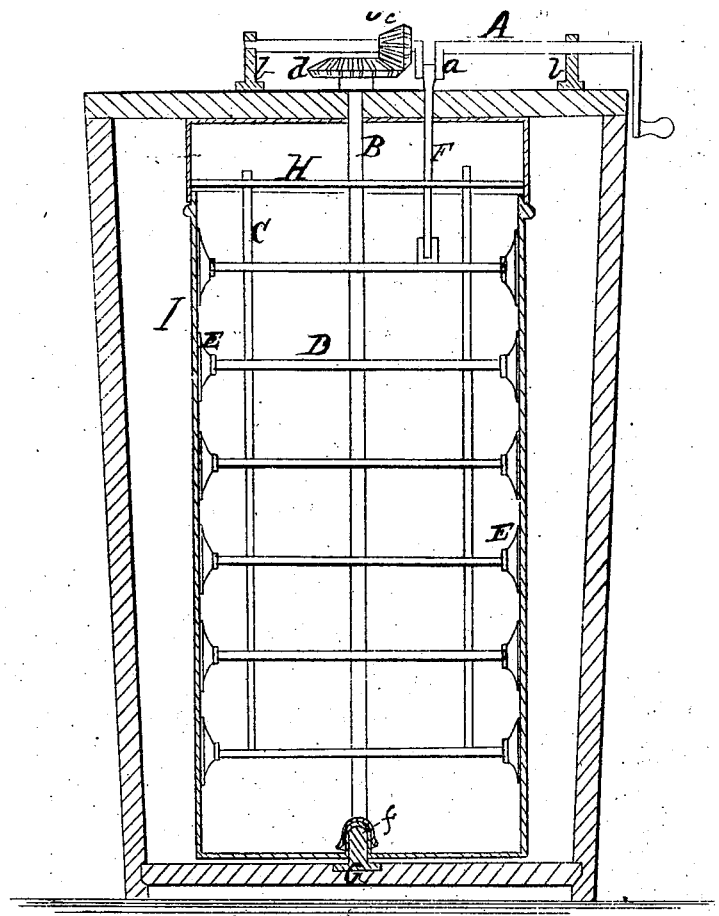
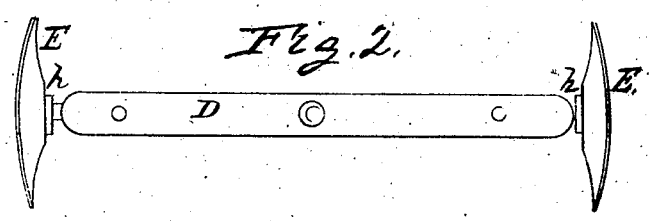
Fig. 2.
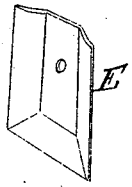
Fig. 3.
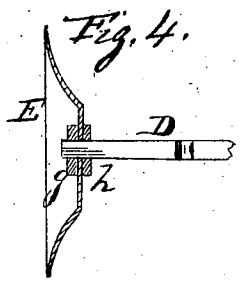
Fig. 4.
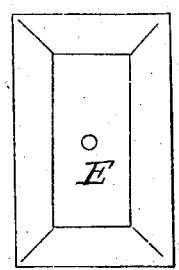
Fig. 5.
Witnesses
D. F. Dodge
R. C. Lowry
Inventor
F. G. Siemers
by Dodge & Munn
his Attys

United States Patent Office.

FRANZ G. SIEMERS, OF WINONA, MINNESOTA.

Letters Patent No. 75,209, dated March 3, 1868.

IMPROVED SCRAPER FOR ICE-CREAM FREEZERS.

*The Schedule referred to in these Letters Patent and making part of the same.*

TO ALL WHOM IT MAY CONCERN:

Be it known that I, FRANZ G. SIEMERS, of Winona, in the county of Winona, and State of Minnesota, have invented certain new and useful Improvements in Ice-Cream Freezers; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

My invention relates to ice-cream freezers, and consists in certain new and useful improvements in my ice-cream freezer, for which I filed an application on the 11th day of December, 1867, and for which a patent was granted to me on the 21st day of January, 1868. My improvements consist specially in the use of adjustable scrapers, of a novel form, in the place, when desired, of the rigidly-attached conical scrapers claimed in my above-mentioned patent. In the drawings—

Figure 1 is a longitudinal vertical section, and

Figures 2, 3, and 5 are views of parts detached; and in

Figure 4, with the part detached in section.

I construct all of the parts of my ice-cream freezer in the same manner as described in my above-mentioned patent, except the scrapers E, and the manner of attaching them to the bars D. The shaft A is mounted in two uprights, b, and has a double crank, a, connecting it, by the pitman F, to the bars D, which are rigidly connected by the vertical bars C, which move easily in the cross-piece H, which serves as a guide for them. The shaft A is also provided with a bevel-pinion, c, which gears into the bevel-cog wheel d, and is attached to the vertical shaft B, which turns upon the thimble f of the freezer I, which revolves upon the pin G, all constructed and arranged to operate as shown in my said patent, as well as in fig. 1.

The scrapers in my said patent are made conical, and rigidly attached to the cross-bars D. In my present improvement I make them rectangular, and with all of their sides flaring, as shown in fig. 5, or with only three sides flaring, as shown in fig. 3. The upper and lower edges of the scrapers I curve sufficiently to correspond with the inner surface of the freezer, as shown in fig. 2. These scrapers I make so as to fit easily on the ends of the bars D, which have screw-threads cut upon them, and screw-nuts g and h to fit, so that there may be one of these nuts on each side of the scraper, as shown in fig. 4, for adjusting it, and holding it securely in place when adjusted. These scrapers E, when constructed in this manner, will, when in operation, constantly force the cream, as it freezes, from the inner surface of the freezer to the centre, and allow another quantity to come in contact with the cold surface, and that they will do whether they scrape vertically or laterally. Their upward and downward motion will cause them to scrape vertically, and the revolving of the freezer will cause them to scrape laterally.

By means of the screw on the ends of the bars D, and the nuts g and h, the scrapers E can be adjusted. It is obvious that they may be adjusted in other similar ways, and I do not intend to confine myself exclusively to the way shown and described.

In operating scrapers of the form described, and shown in the drawings, it will be seen that, in whatever direction they strike the cream, the effect will be to force the cream away from the sides of the freezer. By this means the cream is kept constantly stirred, so as to secure its being frozen uniformly and evenly through the whole interior of the freezer.

Having thus described my invention, what I claim, is—

The scraper E, constructed substantially as described, and made adjustable on the arm D, as set forth.

FRANZ G. SIEMERS.

Witnesses:
THOMAS SIMPSON,
GEO. P. WILSON.